United States Patent
Oxenløwe et al.

(10) Patent No.: US 10,396,929 B2
(45) Date of Patent: Aug. 27, 2019

(54) ALL-OPTICAL REGENERATION SYSTEM FOR OPTICAL WAVELENGTH DIVISION MULTIPLEXED COMMUNICATION SYSTEMS

(71) Applicant: Danmarks Tekniske Universitet, Lyngby (DK)

(72) Inventors: Leif Katsuo Oxenløwe, Hillerød (DK); Hans Christian Hansen Mulvad, Copenhagen NV (DK); Michael Galili, Roskilde (DK); Zohreh Lali-Dastjerdi, Kgs. Lyngby (DK); Francesco Da Ros, Kgs. Lyngby (DK); Evarist Palushani, Copenhagen S (DK); Christophe Peucheret, Frederiksberg (DK); Hao Hu, Kgs. Lyngby (DK)

(73) Assignee: Danmarks Tekniske Universitet, Lyngby (DK)

( * ) Notice: Subject to any disclaimer, the term of this patent is extended or adjusted under 35 U.S.C. 154(b) by 0 days.

(21) Appl. No.: 14/774,604

(22) PCT Filed: Mar. 13, 2014

(86) PCT No.: PCT/DK2014/050061
§ 371 (c)(1),
(2) Date: Sep. 10, 2015

(87) PCT Pub. No.: WO2014/139538
PCT Pub. Date: Sep. 18, 2014

(65) Prior Publication Data
US 2016/0065324 A1   Mar. 3, 2016

Related U.S. Application Data
(60) Provisional application No. 61/782,527, filed on Mar. 14, 2013.

(30) Foreign Application Priority Data
Mar. 14, 2013 (EP) .................................. 13159278

(51) Int. Cl.
*H04J 4/00* (2006.01)
*H04J 14/00* (2006.01)
(Continued)

(52) U.S. Cl.
CPC ...... *H04J 14/0223* (2013.01); *H04B 10/2519* (2013.01); *H04B 10/2543* (2013.01);
(Continued)

(58) Field of Classification Search
CPC ............ H04B 10/2519; H04B 10/2543; H04J 14/0223
(Continued)

(56) References Cited

U.S. PATENT DOCUMENTS

| | | | |
|---|---|---|---|
| 6,337,755 B1 | 1/2002 | Cao | |
| 6,587,242 B1 * | 7/2003 | Shake | ................ H04B 10/0775 398/98 |

(Continued)

OTHER PUBLICATIONS

Mulvad, Hans Christian Hansen, "DWDM-TO-OTDM Conversion by Time-Domain Optical Fourier Transformation", 2011, ECOC Technical Digest.*
(Continued)

*Primary Examiner* — David C Payne
*Assistant Examiner* — Pranesh K Barua
(74) *Attorney, Agent, or Firm* — Knobbe Martens Olson & Bear LLP

(57) ABSTRACT

The invention relates to an all-optical regeneration system for regeneration of optical wavelength division multiplexed WDM data signals in an optical WDM communication system. The system comprises a WDM-to-Optical time
(Continued)

domain multiplexing OTDM, WDM-to-OTDM, converter, capable of converting an input WDM data signal comprising multiple wavelength channels into an input OTDM data signal comprising multiple time multiplexed time channels. The system further comprises an all-optical regenerator unit being configured for regenerating the input OTDM data signal into an output OTDM data signal. The system additionally comprises an OTDM-to-WDM converter for converting the output OTDM data signal to an output WDM data signal. An input of the all-optical regenerator unit is in optical communication with an output of the WDM-to-OTDM converter, and an output of the all-optical regenerator unit is in optical communication with an input of the OTDM-to-WDM converter. The invention further relates to a method for all-optical regeneration of WDM data signals.

12 Claims, 2 Drawing Sheets

(51) Int. Cl.
H04J 14/08 (2006.01)
H04B 10/00 (2013.01)
H04J 14/02 (2006.01)
H04B 10/299 (2013.01)
H04B 10/294 (2013.01)
H04B 10/2519 (2013.01)
H04B 10/2543 (2013.01)

(52) U.S. Cl.
CPC ........ *H04B 10/294* (2013.01); *H04B 10/299* (2013.01); *H04J 14/02* (2013.01); *H04J 14/08* (2013.01)

(58) Field of Classification Search
USPC .................................. 398/75, 68, 98, 154
See application file for complete search history.

(56) References Cited

U.S. PATENT DOCUMENTS

| | | | | |
|---|---|---|---|---|
| 7,043,164 B1* | 5/2006 | Cotter | ........... | H04B 10/299 398/175 |
| 7,076,168 B1* | 7/2006 | Shattil | ........... | H04B 10/25752 398/202 |
| 7,505,690 B2 | 3/2009 | Vasilyev et al. | | |
| 8,280,258 B2* | 10/2012 | Frankel | ........... | H04B 10/25253 398/150 |
| 8,482,847 B2* | 7/2013 | Kuo | ........... | G02B 6/02219 359/330 |
| 9,110,352 B2* | 8/2015 | Kuo | ........... | G02B 6/02219 |
| 2001/0009465 A1 | 7/2001 | Uehara | | |
| 2001/0021288 A1 | 9/2001 | Watanabe et al. | | |
| 2002/0003641 A1* | 1/2002 | Hall | ........... | H04B 10/532 398/65 |
| 2002/0044723 A1* | 4/2002 | Hironishi | ........... | G02B 6/2861 385/24 |
| 2002/0075536 A1 | 6/2002 | Cao | | |
| 2004/0047633 A1* | 3/2004 | Hoshida | ........... | H04B 10/505 398/102 |
| 2005/0185965 A1* | 8/2005 | Watanabe | ........... | H04B 10/25137 398/161 |
| 2005/0226623 A1* | 10/2005 | Pincemin | ........... | H04J 14/0223 398/98 |
| 2006/0051100 A1* | 3/2006 | Watanabe | ........... | H04J 14/08 398/152 |
| 2006/0171716 A1 | 8/2006 | Vasilyev et al. | | |
| 2007/0053692 A1* | 3/2007 | Hoshida | ........... | H01S 3/302 398/97 |
| 2007/0109957 A1* | 5/2007 | Hirooka | ........... | H04B 10/503 370/210 |
| 2007/0183710 A1* | 8/2007 | Coquille | ........... | H04J 14/0223 385/24 |
| 2008/0080859 A1* | 4/2008 | Kagawa | ........... | H04B 10/505 398/42 |
| 2008/0085127 A1* | 4/2008 | Nakamoto | ........... | H04B 10/25137 398/185 |
| 2009/0269070 A1* | 10/2009 | Porzi | ........... | H04J 14/083 398/98 |
| 2010/0221011 A1* | 9/2010 | Pinceman | ........... | H04J 7/00 398/79 |
| 2012/0213521 A1* | 8/2012 | Zhang | ........... | H04B 10/5561 398/79 |
| 2012/0263480 A1* | 10/2012 | Ciaramella | ........... | H04B 10/299 398/176 |
| 2016/0065324 A1* | 3/2016 | Oxenlowe | ........... | H04B 10/299 398/75 |

OTHER PUBLICATIONS

Mulvad, Hans Christian Hansen, "DWDM-TO-OTDM Conversion by Time-Domain Optical Fourier Transformation", 10, 2011, ECOC Technical Digest.*
Bogoni, Antonella et al., "640 Gb/s All-Optical Regenerator Based on a Periodically Poled Lithium Niobate Waveguide" Journal of Lightwave Technology, Jun. 15, 2012, pp. 1829-1834, vol. 30, No. 12.
Da Ros, Francesco et al., "QPSK Phase Regeneration in Saturated Degenerate Dual-pump Phase Sensitive Amplifiers" IEEE Photonics Conference, IPC'2011, Arlington, Virginia, Oct. 2011, pp. 105-106.
Ji, H. et al., "40 Gbit/s serial data signal regeneration using self-phase modulation in a silicon nanowire" IEEE Photonics Conference 2012, Burlingame, California, paper ThQ1, 2012, pp. 832-833.
Lakoba, Taras I. et al., "Low-power, phase-preserving 2R amplitude regenerator" Optics Communications, 2012, pp. 331-337, vol. 285.
Mulvad, Hans Christian Hansen et al., "Ultra-high-speed optical serial-to-parallel data conversion by time-domain optical Fourier transformation in a silicon nanowire" Optics Express, Dec. 12, 2011, pp. B825-B835, vol. 19, No. 26.
Mulvad, H.C. Hansen et al., "DWDM-to-OTDM Conversion by Time-Domain Optical Fourier Transformation" European Conference on Optical Communication, ECOC' 11, Geneva, Switzerland, Sep. 2011. Paper Mo. 1 .A.5.
Mulvad, H.C. Hansen et al., "Recent Advances in Ultra-High-Speed Optical Signal Processing" Paper Tu. 1 .A.5, ECOC Technical Digest, 2012.
Palushani, E. "OTDM-to-WDM Conversion of Complex Modulation Formats by Time-Domain Optical Fourier Transformation" OFC/NFOEC Technical Digest, 2012.
Patki, Pallavi G. et al., "Multichannel all-optical regeneration" the IEEE Photonics Society Summer Topical Meeting on Nonlinear Fiber Optics, Playa del Carmen, Mexico, Jul. 19-21, 2010, paper WC2.2.
Peucheret, Christophe et al., "Amplitude Regeneration of RZ-DPSK Signals in Single-Pump Fiber-Optic Parametric Amplifiers" IEEE Photonics Technology Letters, Jul. 1, 2009, pp. 872-874, vol. 21, No. 13.
Vasilyev, Michael et al., "All-optical multichannel 2R regeneration in a fiber-based device" Optics Letters, Jun. 15, 2005, pp. 1458-1460, vol. 30, No. 12.
Wang, J. et al., "All-Optical 2R Regeneration of a 160-Gbit/s RZOOK Serial Data Signal Using a FOPA" IEEE Photonics Conference 2012, Burlingame, California, paper MM4, 2012, pp. 108-109.
Watanabe, S. et al., "160 Gbit/s Optical 3R-Regenerator in a Fiber Transmission Experiment" in Optical Fiber Communication Conference, Technical Digest, Optical Society of America, 2003, pp. PD16-1-PD16-3.
Yu, C. et al., "Wavelength-Shift-Free 3R Regenerator for 40-Gb/s RZ System by Optical Parametric Amplification in Fiber" IEEE Photonics Technology Letters, Dec. 15, 2006, pp. 2569-2571, vol. 18, No. 24.

(56) References Cited

OTHER PUBLICATIONS

International Search Report for PCT/DK2014/050061 dated Apr. 24, 2014.
Palushani, et al, OTDM-to-WDM Conversion Based on Time-to-Frequency Mapping by Time-Domain Optical Fourier Transformation, IEEE Journal of Selected Topic in Quantum Electronics, 18(2):681-688 (2012).

* cited by examiner

ALL-OPTICAL REGENERATION SYSTEM FOR OPTICAL WAVELENGTH DIVISION MULTIPLEXED COMMUNICATION SYSTEMS

CROSS REFERENCE TO RELATED APPLICATIONS

This application is a U.S. National Phase Application of PCT International Application Number PCT/DK2014/050061, filed on Mar. 13, 2014, designating the United States of America and published in the English language, which is an International Application of and claims the benefit of priority to European Patent Application No. 13159278.4, filed on Mar. 14, 2013, and U.S. Provisional Application No. 61/782,527, filed on Mar. 14, 2013. The disclosures of the above-referenced applications are hereby expressly incorporated by reference in their entireties.

FIELD OF THE INVENTION

The present invention relates to optical signal processing in communication systems, in particular to an all-optical regeneration system for optical wavelength division multiplexing communication systems.

BACKGROUND OF THE INVENTION

In order to increase the data transmission rate of fibre-optic communication systems, multiple closely packed wavelength channels are commonly transferred over the same fibre. Such wavelength division multiplexing (WDM) systems may employ in-line optical amplification, e.g. by use of Erbium-doped fibre amplifiers (EDFAs), which work to amplify the optical data transferred in all the wavelength channels simultaneously.

In some cases, e.g. when transmitting over extended distances, signal degradation builds up to a level where signal regeneration is desirable, i.e. to improve the dynamic range of the signals. However, regeneration of all the channels in a WDM system so far require demultiplexing the signals to split out each individual wavelength channel, performing regeneration either optically or electrically, and re-multiplexing the signals into an output WDM signal. Such a system 1 is schematically shown in FIG. 1, where an incoming WDM signal 2 has degraded after transmission over a fibre span 3, to the point where regeneration is desired. The WDM signal is demultiplexed into individual data paths in a demux unit 4, after which each of the channels are reshaped and possibly retimed in individual regenerators 5, before being multiplexed together into a WDM signal again in a mux unit 6. Finally, the WDM signal is re-amplified in an amplifier, such as an EDFA 7. Re-shaping and re-amplification together being regeneration of the signal (so-called "2R"-regeneration, and "3R"-regeneration if retiming is also performed).

Regeneration of multiple wavelength channels have been demonstrated in the electrical domain, i.e. by first detecting the demultiplexed optical signals to generate parallel electrical signals, performing the regeneration and subsequently re-transmitting the signals as optical data. However, electrical systems are limited as to the data rates obtainable.

US2006171716A1 discloses an optical regeneration system for WDM signals. The system disclosed comprises deinterleaving the incoming WDM signal into four channel sets, to increase the channel spacing within each set. To limit the nonlinear interaction between channels in a set, a concatenation of sections of highly nonlinear fibre and dispersion-compensating periodic-group-delay devices (PGDD) are used. The PGDD are designed to provide a carefully selected group delay for the different spectral components in each channel of a set. Thus, the PGDD limits the operation of the regeneration system to a fixed number of channels, at fixed wavelengths. Furthermore, the disclosed regenerator system only works for amplitude modulated signals, i.e. on-off keyed (OOK) signals. As the incoming signals are deinterleaved into four channel sets, four parallel regenerators are needed, thus adding to the system complexity and energy consumption.

US 2001/0021288 A1 discloses a method for waveform shaping of WDM signal light. This method includes the steps of supplying signal light to a first waveform shaper to obtain intermediate signal light, dividing the intermediate signal light into first and second signal lights, supplying the first signal light to a clock recovery circuit to obtain a clock pulse, and supplying the second signal light and the clock pulse to a second waveform shaper to obtain regenerated signal light synchronous with the clock pulse.

US 2005/0185965 A1 discloses an optical synchronizer, which synchronizes the timing of signal light with a plurality of wavelengths (i.e. a WDM signal), the timing of which is not synchronized (asynchronous) in terms of time. Conversion of the synchronized WDM signal to an optical time domain multiplexing (OTDM) signal via an optical gate is also disclosed Hence, an improved optical regeneration system for WDM signals would be advantageous, and in particular a more energy efficient regeneration system would be advantageous. Furthermore, a regeneration system suitable for phase-encoded signals would be advantageous.

OBJECT OF THE INVENTION

It is a further object of the present invention to provide an alternative to the prior art.

In particular, it may be seen as an object of the present invention to provide a regeneration system that solves the above mentioned problems of the prior art with scalability to a different number of channels and/or other channel centre wavelengths, that supports other modulation formats, and that avoids or limits the need for parallel regenerator units.

SUMMARY OF THE INVENTION

Thus, the above described object and several other objects are intended to be obtained in a first aspect of the invention by providing an all-optical regeneration system for regeneration of optical wavelength division multiplexed WDM data signals in an optical WDM communication system. The system comprises a WDM-to-Optical time domain multiplexing (OTDM), WDM-to-OTDM, converter, capable of converting an input WDM data signal comprising multiple wavelength channels into an input OTDM data signal comprising multiple time multiplexed time channels. The system further comprises an all-optical regenerator unit being configured for regenerating the input OTDM data signal into an output OTDM data signal. The system additionally comprises an OTDM-to-WDM converter for converting the output OTDM data signal to an output WDM data signal. An input of the all-optical regenerator unit is in optical communication with an output of the WDM-to-OTDM converter, and an output of the all-optical regenerator unit is in optical communication with an input of the OTDM-to-WDM converter. In this way, the need for individual regeneration of each wavelength channel is alleviated. Thereby, a more energy efficient regeneration system may be achieved. Furthermore, the component count may be reduced, potentially resulting in a more compact and/or more economical system.

In the context of this text, regeneration of a data signal is to be understood as re-shaping of the signal, to improve a dynamic range thereof, and re-amplification of the signal (so-called "2R" regeneration). Furthermore, regeneration may also comprise re-timing the signal to e.g. remove/minimize timing jitter, etc. (so-called "3R" regeneration). Analogously, a regenerator unit is a unit configured for performing regeneration of an incoming data signal.

Suitable WDM-to-OTDM and OTDM-to-WDM converters are, for instance, described in Mulvad et al., "Recent Advances in Ultra-High-Speed Optical Signal Processing", Paper Tu.1.A.5, ECOC Technical Digest, 2012, and references therein, which is hereby incorporated by reference for at least the purpose of describing said converters.

The inventors envision the applicability of many different all-optical regenerator units, depending on the modulation format of the input WDM signal.

In an embodiment of the inventive system, the WDM-to-OTDM converter and/or the OTDM-to-WDM converter is or comprises a time-domain optical Fourier transformation OFT unit. Thus, a phase-preserving conversion between WDM signals and OTDM signals may be achieved. This is important for phase-encoded signals, e.g. using differential phase-shift keying (DPSK), etc.

In an embodiment of the inventive system, the WDM-to-OTDM and/or the OTDM-to-WDM converter comprises at least a first and a second time-domain OFT unit.

In an embodiment of the inventive system, the WDM-to-OTDM and OTDM-to-WDM converters are implemented as a single converter, configured for WDM-to-OTDM conversion when data is transmitted in a first direction through the converter, and configured for OTDM-to-WDM conversion when data is transmitted in an opposite, second direction through the converter. In this way, the number of components in the system may be reduced.

In an embodiment of the inventive system, the OFT unit comprises a phase-modulation element and a dispersive element.

In an embodiment of the inventive system, the phase modulation element is adapted to perform four-wave mixing FWM between the input OTDM data signal and/or an intermediate OTDM-WDM data signal and an optical pump signal during use. In this way, a particularly fast and large phase modulation may be achieved, thus potentially enabling high data transmission rates.

In an embodiment of the inventive system, the phase modulation element of the OFT comprises a highly nonlinear fibre HNLF. In this way, a high FWM conversion efficiency may be achieved.

In one embodiment of the invention, the HNLF has a nonlinear coefficient $\gamma$ in the range of 1-100 $W^{-1}$ $km^{-1}$, such as in the range of 5-20 $W^{-1}$ $km^{-1}$, or even in the range 8-12 $W^{-1}$ $km^{-1}$.

In another embodiment of the invention, the phase modulation element comprises a silicon nanowire. In this way, a particularly compact FWM element may be achieved.

In an embodiment of the inventive system, the dispersive element is or comprises a dispersion compensating fibre DCF.

In an embodiment of the inventive system, the dispersive element is or comprises a fibre Bragg grating.

In an embodiment of the inventive system, the OTDM regenerator unit is or comprises an optical Kerr-device, the Kerr-device being configured to enable the input OTDM data signal to undergo a nonlinear optical process based on the optical Kerr effect, such as self-phase modulation. In this way, all-optical regeneration at high bit rates may be achieved, due to the very fast response time of the optical Kerr-effect.

In an embodiment of the inventive system, the WDM-to-OTDM converter comprises a further phase-modulation element adapted for aligning the OTDM data signals to substantially spectrally coincide.

In an embodiment of the inventive system, the OTDM regenerator unit is or comprises a fibre-optic parametric amplifier FOPA. A FOPA is attractive to enable phase-preserving regeneration. Thus, phase-encoded information in the input WDM data signal may be retained during the conversions and regeneration. Thereby, a regeneration system suitable for phase-keyed information (e.g. using DPSK, quadrature phase-shift keying (QPSK), etc.) may be achieved. Regeneration of on-off keyed (OOK) signals may also be achieved by use of a FOPA.

In an embodiment of the inventive system, the WDM communication system is a dense WDM DWDM system, the WDM-to-OTDM converter is a DWDM-to-OTDM converter, and the OTDM-to-WDM converter is an OTDM-to-DWDM converter. DWDM systems pose a special problem for optical signal processing in general and regeneration in particular, due to the very narrow spacing between neighbouring wavelength channels. This in general means that even a small signal deterioration in a channel, e.g. due to chromatic dispersion, may result in the pulse spectrally broadening so as to extend into spectral slots of the neighbouring channels—thereby causing cross-talk between the channels.

Furthermore, the above described object and several other objects are intended to be obtained in a second aspect of the invention by providing a method for all-optical regeneration of optical wavelength division multiplexed WDM data signals in a communication system. The method comprises converting an input WDM signal comprising multiple wavelength channels to an input optical time domain multiplexed OTDM signal, comprising multiple time multiplexed time channels in a single wavelength channel. The method further comprises regenerating the input OTDM signal by use of an all-optical regenerator into an output OTDM data signal. The method additionally comprises converting the output OTDM signal to an output WDM signal.

In an embodiment of the inventive method, the method further comprises synchronizing the WDM input signal prior to the WDM-to-OTDM conversion, so that a bit slot in a first wavelength channel temporally aligns with a bit slot in a second wavelength channel. In this way, cross-talk induced between the data channels during conversion and regeneration is minimized. It should be noted that a bit train at the first wavelength channel may be any integer number of bit slots shifted with respect to a bit train at the second wavelength channel, as long as the bit slots temporally coincide or at least substantially coincides.

In an embodiment of the inventive method, the WDM-to-OTDM conversion comprises phase modulating the input WDM signal into an intermediate WDM-OTDM signal, and dispersing the intermediate WDM-OTDM signal into the input OTDM signal.

In an embodiment of the inventive method, the OTDM-to-WDM conversion comprises dispersing the output OTDM signal into an intermediate OTDM-WDM signal, and phase modulating the intermediate OTDM-WDM signal into the output WDM signal.

The first and second aspect of the present invention may each be combined with any of the other aspects. These and other aspects of the invention will be apparent from and elucidated with reference to the embodiments described hereinafter.

BRIEF DESCRIPTION OF THE FIGURES

The regeneration system according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
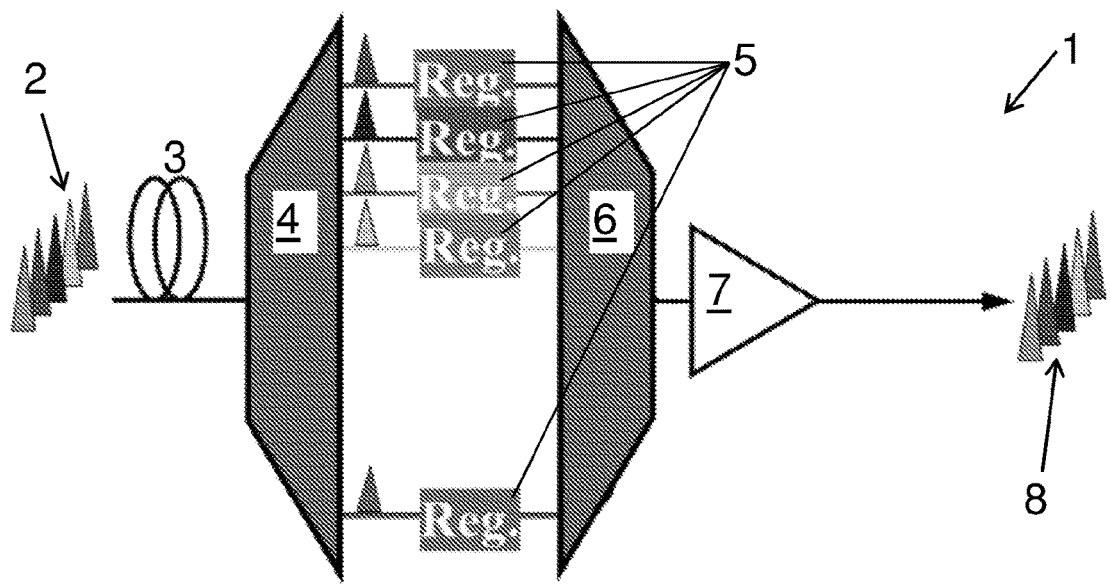
FIG. 1 is a schematic illustration of regeneration systems according to the prior art, and was described above.
Figure 2:
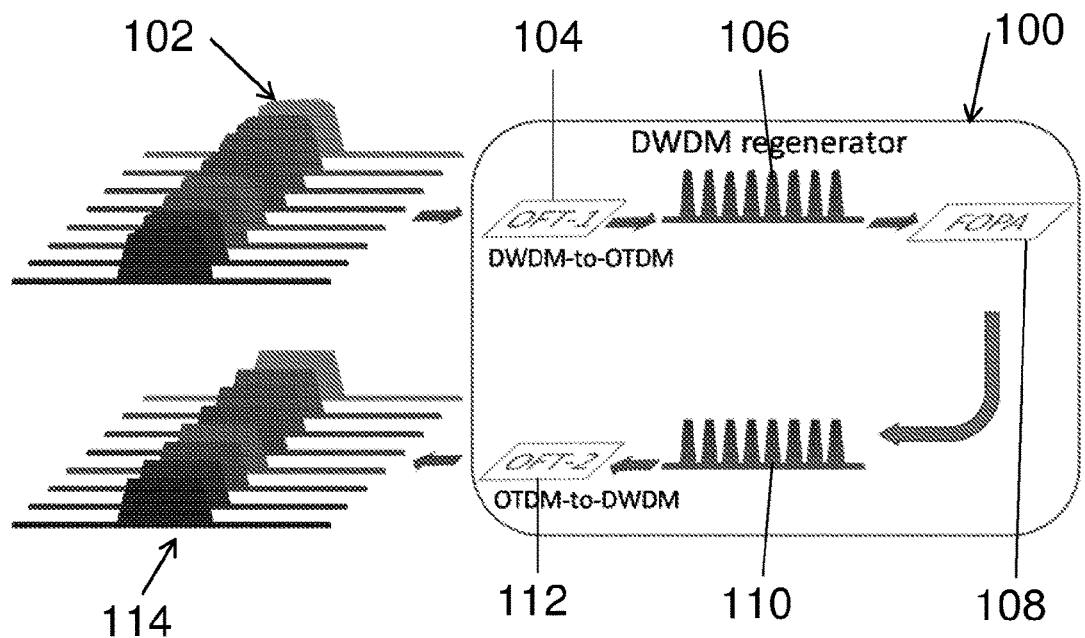
FIG. 2 illustrates an embodiment of the inventive system.

FIG. 2 shows an embodiment of the regeneration system 100 according to the invention. A degraded, input WDM data signal 102, in this case being a dense WDM (DWDM) signal, is coupled into a DWDM-to-OTDM converter 104 (OTDM, optical time domain multiplexing). The DWDM-to-OTDM converter 104 is realized as a time-domain optical Fourier transformation (OFT) unit, and converts the input WDM signal into an input OTDM signal 106. It is seen that the individual pulses in the input OTDM signal 106 do not have the same amplitude, and have a degenerated pulse shape (here illustrated as having a rounded peak). The input OTDM signal 106 is coupled into the regenerator, which is here realized as a fibre optic parametric amplifier (FOPA) 108. The regenerator 108 is adapted to work at high bitrates, as the bit rate of the OTDM signal is substantially the bitrate of a single WDM wavelength channel times the number of channels. For this reason, regenerators based on the optical Kerr-effect, such as self-phase modulation (SPM), cross-phase modulation (XPM), four wave mixing as in the present case for the FOPA, or a Kerr switch are attractive candidates, depending on the modulation format. It is seen that the output OTDM signal 110 after regeneration in the FOPA 108 is much sharper defined than the input signal 106, in that the pulses have been reshaped to have substantially the same amplitude, and are generally more well defined. Finally, the output OTDM signal 110 is converted back into a DWDM output signal 114, by a OTDM-to-DWDM converter, also realized as an OFT unit 112.

A suitable OTDM-to-DWDM converter based on an OFT unit is described in Mulvad, et al. "Ultra-high-speed optical serial-to-parallel data conversion by time-domain optical Fourier transformation in a silicon nanowire", Optics Express 19(26), B825-35, 2011, which is hereby incorporated by reference for at least the purpose of describing an implementation of such a converter.

A suitable DWDM-to-OTDM converter also based on an OFT unit is described in Mulvad, et al., "DWDM-to-OTDM Conversion by Time-Domain Optical Fourier Transformation", paper Mo.1.A.5, ECOC Technical Digest, 2011, which is hereby incorporated by reference for at least the purpose of describing an implementation of such a converter.

A suitable regenerator for QPSK-encoded data is described in F. Da Ros and C. Peucheret, "QPSK Phase Regeneration in Saturated Degenerate Dual-pump Phase Sensitive Amplifiers", paper MM3, IEEE Photonics Conference, IPC'2011, Arlington, Va., USA, October 2011, which is hereby incorporated by reference for at least the purpose of describing an implementation of such a regenerator.

Figure 3:
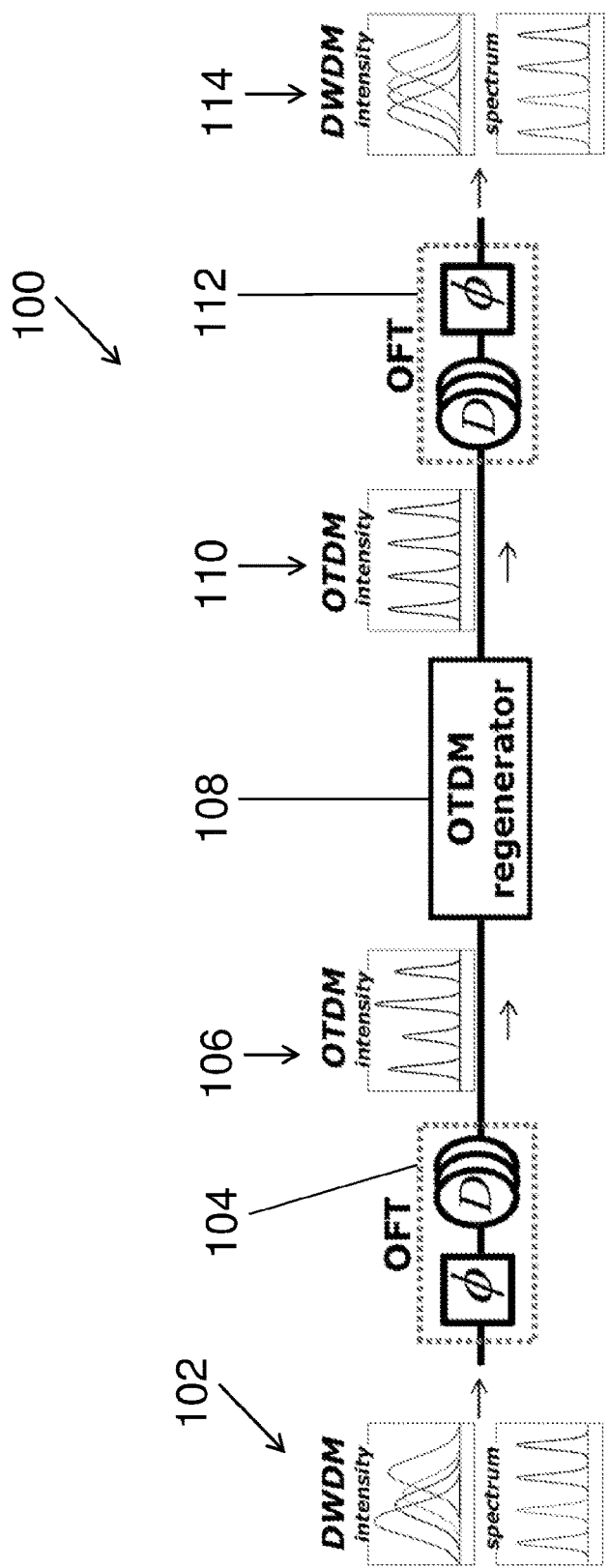
FIG. 3 illustrates an embodiment of the inventive system.

FIG. 3 shows a similar embodiment of the regenerator system 100, as illustrated in FIG. 2. Therefore, only the differences between the two systems and/or figures will be discussed here. The input WDM signal 102 is seen to be spectrally properly spaced, but to exhibit significant intensity variations between the different wavelength channels. The OFT 104 is seen to comprise a phase modulator, $\phi$, capable of inducing a chirp in the individual pulses of the input OTDM signal 106, where after the signal is dispersed in a dispersive element D, such as an optical fibre. When converting back in the OTDM-to-DWDM converter, the output OTDM signal is first dispersed and then phase-modulated in the second OFT unit 112.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. An all-optical regeneration system for regeneration of optical wavelength division multiplexed (WDM) data signals in an optical WDM communication system, the all-optical regeneration system comprising:

a WDM-to-OTDM converter configured for converting an input WDM data signal comprising multiple wavelength channels into an input optical time domain multiplexing (OTDM) data signal comprising multiple time multiplexed time channels, an all-optical regenerator unit being applicable depending on the modulation format of said input WDM data signal and configured for regenerating the input OTDM data signal into an output OTDM data signal, wherein the all-optical regenerator is configured to work at a high bitrate value that is substantially a bitrate of a single wavelength channel of the multiple wavelength channels times a number of the multiple wavelength channels, and an OTDM-to-WDM converter for converting the output OTDM data signal to an output WDM data signal, wherein said all-optical regenerator system is suitable for phase-keyed information, and an input of the all-optical regenerator unit is in optical communication with an output of the WDM-to-OTDM converter, and an output of the all-optical regenerator unit is in optical communication with an input of the OTDM-to-WDM converter, wherein the WDM-to-OTDM converter and/or the OTDM-to-WDM converter comprises a time-domain optical Fourier transformation (OFT) unit, and the OFT unit comprises a phase-modulation element and a dispersive element.

2. The regeneration system according to claim 1, wherein the phase modulation element is adapted to perform four-wave mixing (FWM) between the input OTDM data signal and/or an intermediate OTDM-WDM data signal and an optical pump signal during use.

3. The regeneration system according to claim 2, wherein the phase modulation element of the OFT comprises a highly nonlinear fibre (HNLF).

4. The regeneration system according to any claim 1, wherein the dispersive element comprises a dispersion compensating fibre (DCF).

5. The regeneration system according to claim 1, wherein the dispersive element comprises a fibre Bragg grating.

6. The regeneration system according to claim 1, wherein the OTDM regenerator unit comprises an optical Kerr-device, the Kerr-device being configured to enable the input OTDM data signal to undergo a nonlinear optical process based on the optical Kerr effect.

7. The regeneration system according to claim 1, wherein the OTDM regenerator unit comprises a fibre-optic parametric amplifier (FOPA).

8. The regeneration system according to claim 1, wherein the WDM communication system is a dense WDM DWDM system, the WDM-to-OTDM converter is a DWDM-to-OTDM converter, and the OTDM-to-WDM converter is a OTDM-to-DWDM converter.

9. The regeneration system according to claim 1, wherein the WDM-to-OTDM converter is configured to phase modulate the input WDM signal into an intermediate WDM-OTDM signal.

10. A method for all-optical regeneration of optical wavelength division multiplexed (WDM) data signals in a communication system, the method comprising:

converting an input WDM signal comprising multiple wavelength channels to an input optical time domain multiplexed (OTDM) signal, comprising multiple time multiplexed time channels in a single wavelength channel, wherein the WDM-to-OTDM conversion comprises:
  phase modulating the input WDM signal into an intermediate WDM-OTDM signal, and
  dispersing the intermediate WDM-OTDM signal into the input OTDM signal,
regenerating the input OTDM signal by use of an all-optical regenerator suitable for phase-keyed information, into an output OTDM data signal, wherein the all-optical regenerator is configured to work at a high bitrate value that is substantially a bitrate of a single wavelength channel of the multiple wavelength channels times a number of the multiple wavelength channels, and
converting the output OTDM signal to an output WDM signal, wherein the OTDM-to-WDM conversion comprises:
  dispersing the output OTDM signal into an intermediate OTDM-WDM signal, and
  phase modulating the intermediate OTDM-WDM signal into the output WDM signal.

11. The method according to claim 10, the method further comprising synchronizing the WDM input signal prior to the WDM-to-OTDM conversion, so that a bit slot in a first wavelength channel temporally aligns with a bit slot in a second wavelength channel.

12. The method according to claim 10, wherein the input WDM data signal comprises a phase modulated signal, and wherein converting an input WDM signal comprising multiple wavelength channels to an input optical time domain multiplexed (OTDM) signal further comprises phase modulating the input WDM signal into an intermediate WDM-OTDM signal.

* * * * *